US012364638B2

(12) United States Patent
Sanchez Zequera

(10) Patent No.: US 12,364,638 B2
(45) Date of Patent: Jul. 22, 2025

(54) BIODEGRADABLE AND INCINERATABLE FUNERAL CASKET WITH FRAME COVERED BY NATURAL FABRICS

(71) Applicant: Henry Sanchez Zequera, Bogota (CO)

(72) Inventor: Henry Sanchez Zequera, Bogota (CO)

( * ) Notice: Subject to any disclaimer, the term of this patent is extended or adjusted under 35 U.S.C. 154(b) by 0 days.

(21) Appl. No.: 18/254,836

(22) PCT Filed: Nov. 26, 2021

(86) PCT No.: PCT/IB2021/061025
§ 371 (c)(1),
(2) Date: May 26, 2023

(87) PCT Pub. No.: WO2022/113026
PCT Pub. Date: Jun. 2, 2022

(65) Prior Publication Data
US 2024/0000645 A1 Jan. 4, 2024

(30) Foreign Application Priority Data
Nov. 27, 2020 (CO) ........................ NC2020/0014799

(51) Int. Cl.
*A61G 17/007* (2006.01)
*A61G 17/00* (2006.01)
(Continued)

(52) U.S. Cl.
CPC ....... *A61G 17/0106* (2017.05); *A61G 17/004* (2016.11); *A61G 17/007* (2013.01);
(Continued)

(58) Field of Classification Search
CPC .. A61G 17/007; A61G 17/004; A61G 17/044; A61G 17/041; A61G 17/0073;
(Continued)

(56) References Cited

U.S. PATENT DOCUMENTS 19,503 A * 3/1858 Hooker et al. ....... A61G 17/007 27/3
120,171 A * 10/1871 Scott ....................... E04H 13/00 52/139
(Continued)

FOREIGN PATENT DOCUMENTS

CA 2577701 A1 * 8/2007 ............. A61G 17/04
EP 1625840 A2 2/2006
(Continued)

OTHER PUBLICATIONS

Colombia office action Feb. 26, 2025.

*Primary Examiner* — William L Miller
(74) *Attorney, Agent, or Firm* — The Morales Law Firm; Joseph L. Morales, Esq.

(57) ABSTRACT

The present invention relates to a coffin with a lower side and an upper side. Said coffin comprises a structure and an inner lid, where the structure includes a first frame located on the lower side of the coffin, a second frame located on the upper side of the coffin, a plurality of ribs connected to the first frame, protruding towards the upper side, and connecting the second frame with said first frame, and a covering surface connected to the ribs. In turn, the inner lid has an arcuate shape and is arranged on an inner side of the second frame, where the ends of the inner lid arcuate shape lay on the ribs of the structure.

Moreover, in some embodiments of the invention the coffin comprises at least one retractable handle arranged on the cover surface. Said handle can comprise a handgrip, a lanyard connected to the handgrip and to the first frame; and an elastic element connected to the cover surface and coupled to the lanyard. The elastic element is set up to exert an elastic force on the lanyard that allows for the handgrip to be drawn towards the cover surface.

8 Claims, 6 Drawing Sheets

(51) Int. Cl.
*A61G 17/02* (2006.01)
*A61G 17/04* (2006.01)

(52) U.S. Cl.
CPC ........... *A61G 17/02* (2013.01); *A61G 17/024* (2017.05); *A61G 17/041* (2016.11)

(58) Field of Classification Search
CPC .............. A61G 17/0106; A61G 17/032; A61G 17/042; A61G 17/024; A61G 17/02
See application file for complete search history.

(56) References Cited

U.S. PATENT DOCUMENTS 186,516 A * 1/1877 Askins ................. A61G 17/007 27/3
427,760 A * 5/1890 Grueninger ........ A61G 17/0076 27/3
555,807 A * 3/1896 Handshy ............ A61G 17/0136 27/7
1,054,289 A * 2/1913 Goodrich ............. A61G 17/007 D99/7
1,708,443 A * 4/1929 Fifer .................. A61G 17/0106 27/1
3,879,818 A * 4/1975 Rowland ............ A61G 17/0136 27/7
4,146,948 A * 4/1979 Royce .................. A61G 17/007 27/5
4,156,956 A * 6/1979 Partridge ............. A61G 17/044 27/4
4,930,197 A * 6/1990 McClive ................ A61G 17/00 27/7
4,944,076 A * 7/1990 Kay ..................... A61G 17/028 27/14
4,967,455 A * 11/1990 Elder ................. A61G 17/0073 27/14
5,153,960 A * 10/1992 Ritter ....................... A47G 9/10 5/640
5,740,592 A * 4/1998 Lau .................... A61G 17/0073 27/19
5,964,014 A * 10/1999 Wang ................... A61G 17/004 27/10
6,202,270 B1 * 3/2001 Bowman ............ A61G 17/0106 27/4
6,557,221 B2 * 5/2003 Cox ..................... A61G 17/004 27/4
6,684,467 B1 2/2004 Walker
7,555,819 B2 * 7/2009 Wensley ............ A61G 17/0106 27/3
8,112,851 B1 * 2/2012 Hughes ................ A61G 17/041 27/27
8,291,556 B2 * 10/2012 Brownlow ........... A61G 17/007 27/3
8,763,218 B2 * 7/2014 Brownlow ........... A61G 17/042 27/3
9,700,477 B1 * 7/2017 Franks ................. A61G 17/001
9,889,057 B1 * 2/2018 Womack .............. A61G 17/041
9,895,278 B2 * 2/2018 Socha ................ A61G 17/0106
12,193,976 B1 * 1/2025 Brinkley-Strickland .................... A61G 17/0073
2002/0053120 A1 * 5/2002 Cox ................... A61G 17/0106 27/4
2005/0108864 A1 * 5/2005 Dennis ................... A61G 17/04 27/14
2008/0034562 A1 * 2/2008 Wensley ................ A61G 17/02 27/3
2011/0252612 A1 * 10/2011 Brownlow ......... A61G 17/0136 27/3
2013/0042447 A1 * 2/2013 Brownlow ......... A61G 17/0166 27/14
2015/0173990 A1 * 6/2015 Tompkins .............. A61G 17/04 27/15

FOREIGN PATENT DOCUMENTS

GB 2440734 A * 2/2008 ............. A61G 17/00
GB 2538767 A * 11/2016 ............. A61G 17/00
KR 100714301 B1 * 5/2007
WO WO-2018069929 A1 * 4/2018
ZA 200309476 A * 10/2004

* cited by examiner

BIODEGRADABLE AND INCINERATABLE FUNERAL CASKET WITH FRAME COVERED BY NATURAL FABRICS

FIELD OF THE INVENTION

The present invention relates to coffins, particularly to biodegradable coffins for burial or cremation of bodies.

DESCRIPTION OF THE PRIOR ART

Today, the average world mortality rate varies around 8.2 people per 1,000 inhabitants. It has been established that of the nearly 64 million deaths, 65% of the bodies are placed in coffins or caskets made of wood or metal. It is also estimated that 60% of the caskets used are made of wood and it is necessary to cut down more than 20 million trees each year to sustain this industry. Moreover, due to the great environmental impact of felling trees, the incineration or burial of these caskets contributes to air and soil pollution, due to the additional materials of which they are composed, such as plastics, textiles, fillers or paints or lacquers with polluting chemicals. On the other hand, incineration of these caskets requires an energy consumption that is between 22.5 and 30 $m^3$ of natural gas, 30 liters of diesel (in efficient ovens) or 900 kWh for approximately 3 hours.

Due to the reasons above, in recent years multiple initiatives have been developed to say goodbye to the deceased in a more ecological way, in caskets or devices with a lower environmental impact during their manufacture and subsequent degradation.

Particularly, in the prior art, coffins such as that of document EP1625840 are disclosed, comprising a frame that defines a lower surface and a vertical wall surface, wherein at least one surface of said wall is covered with braiding on the outer side. Said braiding comprises paper threads but can also include textiles. On the other hand, the frame can be made of wood or wood agglomerate joined together using finger joints.

EP1625840 discloses that the braiding is carried out by means of a loom where the strands of paper are moistened, and then dried to acquire a rigid structure. The document mentions that paper decomposes and burns faster than wood, especially when the paper contains air, so it consumes less energy during incineration.

In a preferred embodiment, the EP1625840 coffin includes a box inside the frame that provides stability and increases hermeticity. This box can be made of multi-layer cardboard and may include a lid. Also, document EP1625840 discloses fixed handles connected to the coffin frame.

On the other hand, document U.S. Pat. No. 7,555,819 discloses a coffin comprising a main frame, a lining, and a lid, all made from biodegradable materials. Said lining comprises a flexible layer attached to the exterior of the main frame to form a box-shaped structure having a cavity for housing a corpse. The frame, the lining and the lid are set up to fit together. Optionally, the lid has fastening means like a screw, to be attached to the upper part of the frame. Moreover, the coffin includes means to facilitate its transport, consisting of a plurality of handles located on each side of the coffin, which are attached to each other by means of a loop that crosses one lateral side of the coffin, surrounding its lower side, and coming out of the opposite lateral side.

Furthermore, U.S. Pat. No. 7,555,819 indicates that the frame can have the shape of a simple rectangular coffin, or other possible shapes, such as a rectangular-shaped coffin with only one rounded end, a coffin with both rounded ends, or a traditional-shaped coffin of "six sides."

On the other hand, on the website http://funerals.naturalburialcompany.com/bamboo-coffin-kit/of the company "Natural Burial Company" a handmade bamboo coffin is disclosed. The coffin has 6 sides, and is suitable for identification, viewing, and services prior to cremation or burial. In the images presented on the website, it is evident that there is a wooden structure providing rigidity to a woven basket-like surface.

Moreover, the company "Natural Burial Company" states on their website that the bamboo coffin decomposes naturally over time, when buried directly in the ground. Furthermore, the bamboo coffin is suitable as a cremation container because it does not contain any metallic or toxic components.

Also, the bamboo coffin optionally comprises an additional viewing lid that allows for the viewing of the deceased during the funeral service. This natural and biodegradable option for burial or cremation, features a fully lined unbleached cotton interior and matching pillow. Moreover, according to the figures published on the website of "Natural Burial Company," the coffin has grip handles located on the side walls of the coffin, which appear to be connected by cords to an upper coffin frame and fastening means between the lid and the frame.

However, the prior art does not disclose retractable handles that detach from the casket and provide an easy grip to a user when it is to be transported, without affecting the original design of the casket. The disclosure does not include features or structures inside the coffin either, that would allow for a better position of the body and reinforce the frame to prevent it from collapsing during handling, transport, and use.

BRIEF DESCRIPTION OF THE INVENTION

The present invention relates to a coffin with a lower side and an upper side. Said coffin comprises a structure and an inner lid, where the structure includes a first frame located on the lower side of the coffin, a second frame located on the upper side of the coffin, a plurality of ribs connected to the first frame, protruding towards the upper side, and connecting the second frame with said first frame, and a cover surface connected to the ribs. In turn, the inner lid has an arcuate shape and is arranged on an inner side of the second frame, where the ends of the inner lid arcuate shape lay on the ribs of the structure.

Moreover, in some embodiments of the invention the coffin comprises at least one retractable handle arranged on the cover surface. Said handle can comprise a handgrip, a lanyard connected to the handgrip and to the first frame; and an elastic element connected to the cover surface and coupled to the lanyard. The elastic element is set up to exert an elastic force on the lanyard that allows for the handgrip to be drawn towards the cover surface.

Furthermore, the coffin may include a support structure for the head of a deceased, arranged on the lower side and comprising a base with a triangular cross section and a surface that lays on said base. In addition, the surface of the head support structure has longitudinal cuts which make the surface more flexible.

Finally, the coffin can include an outer lid arranged on the second frame and be made from biodegradable materials.

BRIEF DESCRIPTION OF THE FIGURES

FIG. 5 shows an embodiment of the coffin in the present invention, where the retractable handle that includes the handgrip, lanyard and elastic element are shown in detail. On the other hand, FIG. 5A shows the location of the handgrip, lanyard, and elastic element when the retractable handle is in its original position, while FIG. 5B shows the movement of the handgrip, lanyard, and the elastic element when the retractable handle is pulled.

FIG. 6A shows the head support structure unfolded, FIG. 6B shows how the head support structure is folded and FIG. 6C shows the head support fully assembled. Moreover, in said FIG. 6A, FIG. 6B and FIG. 6C the surface with longitudinal cuts to improve the ergonomics of the head support and a support plate is shown.

DETAILED DESCRIPTION OF THE INVENTION

Figure 1:
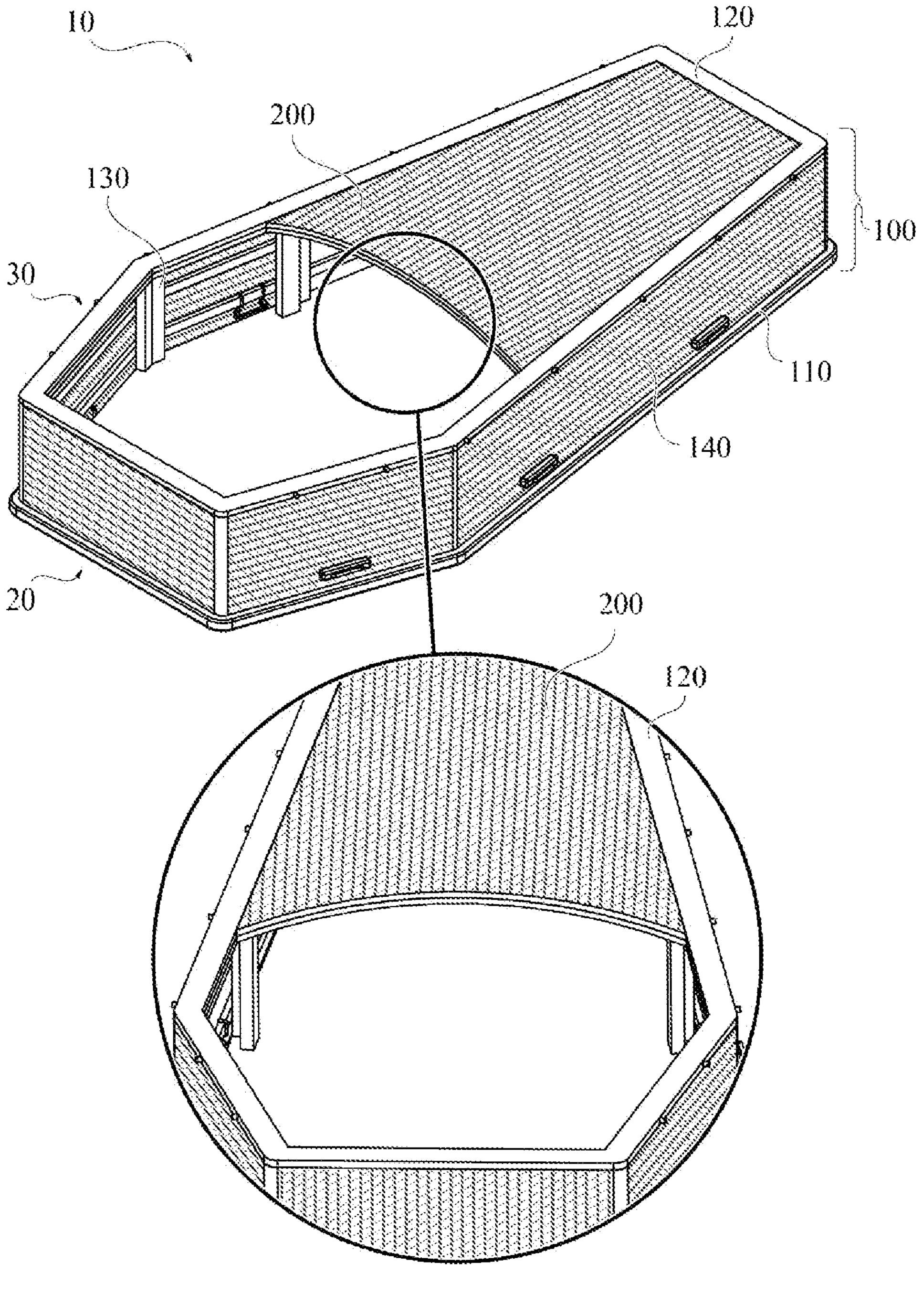
FIG. 1 shows an isometric view of an embodiment of the coffin in the present invention, where the structure, the inner lid, and a detail of the arrangement of said lid on the ribs of the structure are shown.

This invention describes a coffin (10) defined by a lower side (20) and an upper side (30). Said coffin (10) comprises a structure (100) that includes a first frame (110) located on the lower side (20), a second frame (120) located on the upper side (30), a plurality of ribs (130) connected to the first frame (110) protruding towards the upper side (30) and connecting the second frame (120) with said first frame (110), and a cover surface (140) connected to the ribs (130). Moreover, the coffin (10) also comprises an inner lid (200) of an arcuate shape, arranged on an inner side of the second frame (120), where the ends of the arcuate shape of said inner lid (200) lay on the ribs (130).

The coffin (10) of the present invention is preferably biodegradable and incinerable and its cover surface (140) comprises natural fabrics that have a low environmental impact, in their cultivation, harvesting, processing, and final disposal stages. In the same way, the frames (110 and 120), ribs (130) and inner lid (200) are manufactured with biodegradable materials, as well as the additional components that will be detailed later. This allows for the coffin to biodegrade when buried with a body, without contaminating the soil or groundwater. On the other hand, when being cremated together with a body, the composition of the coffin (10) of this invention demands an energy consumption that is at least 50% lower than that of coffins made of solid wood or with plastic or metal parts that weigh up to twice as much.

Figure 2:
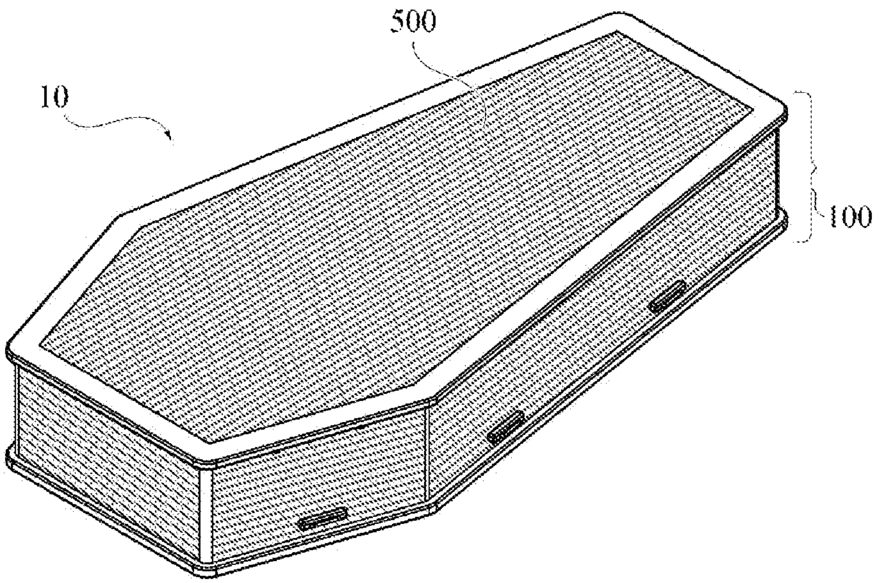
FIG. 2 shows an isometric view of an embodiment of the coffin in the present invention, where the cover surface of the structure and the outer lid are shown.

Referring to FIG. 1 and FIG. 2, the coffin (10) of the present invention is defined by a lower side (20) and an upper side (30) which correspond to the bottom of the coffin (10) where the body is placed, and to the opening through which said body is placed inside, respectively. As mentioned above, the coffin (10) comprises a frame (100) and an inner lid (200). Said structure (100) comprises a first frame (110) located on the lower side (20), a second frame (120) located on the upper side (30), a plurality of ribs (130) connected to the first frame (110) protruding towards the upper side (30) and connecting the second frame (120) with said first frame (110), and a cover surface (140) connected to the ribs (130). Moreover, the coffin (10) also comprises an inner lid (200) of an arcuate shape, arranged on an inner side of the second frame (120), where the ends of the arcuate shape of said inner lid (200) lay on the ribs (130). Optionally, and in some embodiments of the invention, the coffin (10) includes an outer lid (500), like the one shown in FIG. 2, which completely covers the second frame (120).

Figure 3:
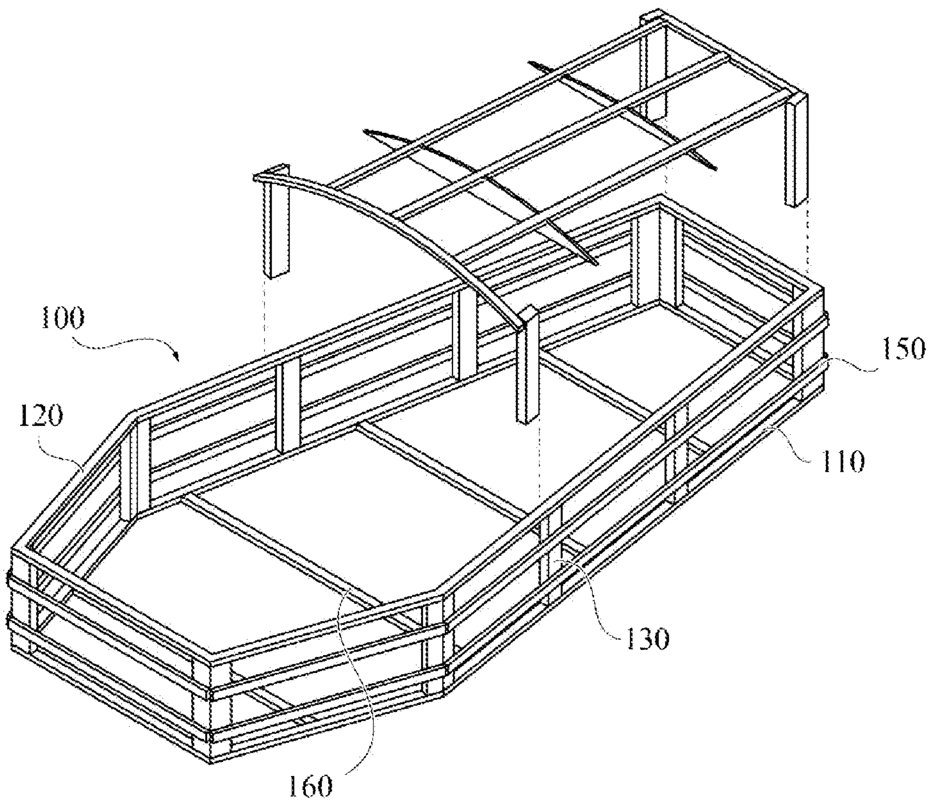
FIG. 3 shows an exploded view of the structure of an embodiment of the coffin in the present invention, where the first frame, the second frame and the ribs are shown. Moreover, the frame of the inner lid is also shown.

As previously mentioned, and referring to FIG. 3, said structure (100) comprises a first frame (110) and a second frame (120) facing each other and joined by means of ribs (130). Said frames can have a perimeter shape that is selected from the group consisting of closed curves such as ellipses, or polygons such as irregular rectangles or hexagons, or combinations thereof such as rectangles with rounded edges. Moreover, said ribs (130) can be a geometric polyhedral body or a geometric body with curved sides, and present chamfers where the frames (110 and 120), other ribs (130 and 120) and the cover surface (140) lay on. Said cover surface (140) can adopt a flat or curved shape according to the shape of the sides in the ribs (130).

On the other hand, the ends of the arcuate shape of the inner lid (200) on said ribs (130) are arranged. The ribs (130) are optionally connected to horizontal ribs (150) that increase the structure resistance (100) and prevent the deformation of the cover surface (140) covering the space between the frames (110 and 120). Also, in some embodiments of the invention, the first frame (110) is connected to cross braces (160) that help support the weight of the body that is placed inside the coffin.

Regarding the inner lid (200), this allows for partial viewing of the content inside the coffin (10). Furthermore, its arcuate shape arranged on the ribs (130) and in the middle of the second frame (120) reinforce the structure (100) of the coffin (10) preventing the walls of said coffin (10) formed by the ribs (130) and the cover surface (140) from collapsing and bending towards the inside of the coffin (10). Optionally, the coffin (10) comprises a sliding mechanism (210) adjacent to the second frame (120) and located above the plurality of ribs (130), where the sliding mechanism (210) allows for moving and adjusting the inner lid (200).

Figure 4:
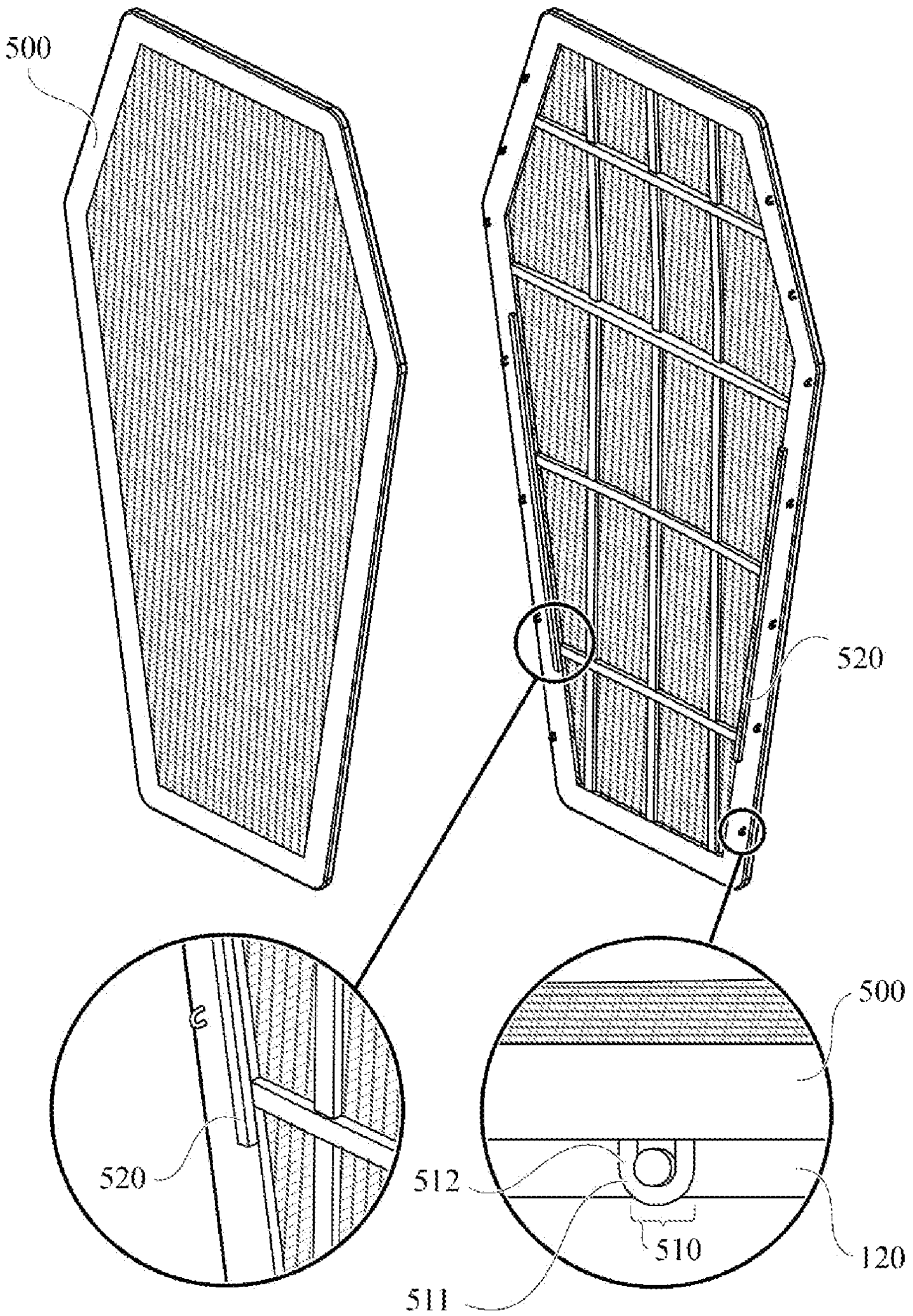
FIG. 4 shows an embodiment of the outer lid of the coffin in the present invention, where the frame of said outer lid is shown. Moreover, a detail of the fastening mechanism is shown.

On the other hand, and referring to FIG. 4, in some embodiments of the invention the coffin (10) includes, as previously mentioned, an outer lid (500) that completely covers the second frame (120). The outer lid (500) may include a fastening mechanism (510) set up to attach said outer lid (500) to the second frame (120). Optionally, said fastening mechanism (510) consists of a pin (511) connected to the second frame (120) and a clip (512) connected to the outer lid (500) on its perimeter, in such a way that the pin (511) and the clip (512) behave like a button and an eyelet respectively to fit the outer lid (500) to the second frame (120) of the coffin (10). Moreover, the outer lid (500) comprises a flange (520) on the inside of its perimeter that fits inside the second frame (120) and allows for the outer lid (500) and the second frame (120) to align properly, so the pin (511) and clip (512) face each other.

Figures 5, 5A, 5B:
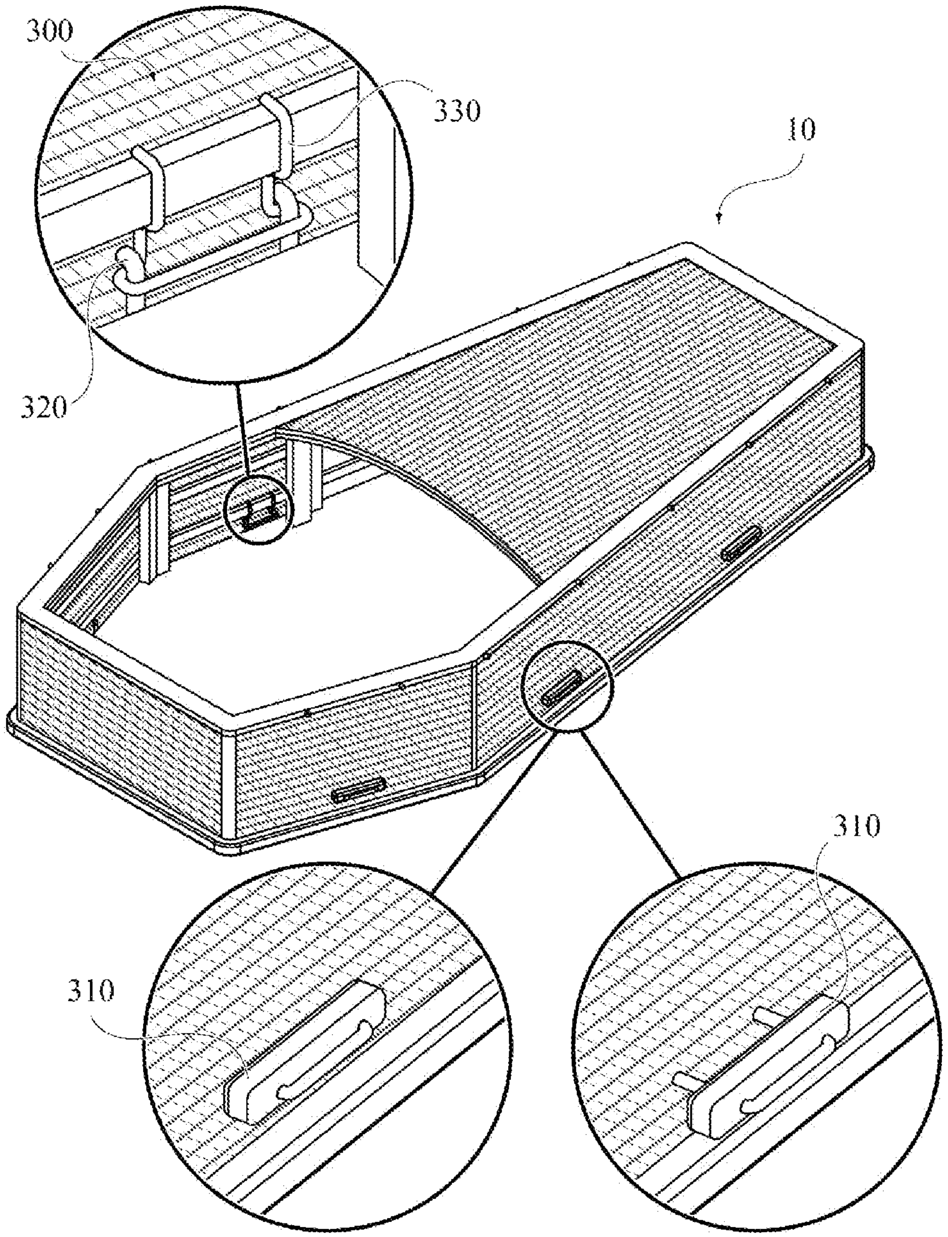

On the other hand, and referring to FIG. 5, in some embodiments of the invention, the coffin also comprises a retractable handle (300) arranged on the cover surface (140). Preferably said retractable handle (300) is connected to the ribs (130) and is made up of a handgrip (310), a lanyard (320) connected to the handgrip (310) and to the first frame (110); and an elastic element (330) connected to the cover surface (140) or to the horizontal ribs (150) and coupled to the lanyard (320). Said elastic element (330) is set up to exert an elastic force on the lanyard (320) that allows for drawing the handgrip (310) towards the cover surface (140). As illustrated in FIG. 5, when the retractable handle (300) is in its original position (FIG. 5A), the elastic element (330) applies a force to the lanyard (320) and keeps it retracted, such that the handgrip (310) contracts against the cover surface (140). However, when the user pulls said handgrip (310) (FIG. 5B) and overcomes the force of the elastic element (330), the lanyard (320) extends, allowing the handgrip (310) to separate from the cover surface (140) so that the user can hold it comfortably, while surrounding it with one hand. As soon as the user stops pulling the handgrip (310), the elastic element (330) again retracts the lanyard (320) into the coffin (10) to return the retractable handle (300) to its original position.

Moreover, the coffin of the present invention can include between one to eight retractable handles (300), depending on the design and established requirements. Preferably, the handgrip (310) is made of natural fibers such as wood, the lanyard (320) is made of hemp, jute or fique fibers, and the elastic element (330) is made of natural rubber. Such materials biodegrade easily, and the combustion gases produced by their incineration do not contain hazardous chemicals or heavy metals.

Figure 6A:
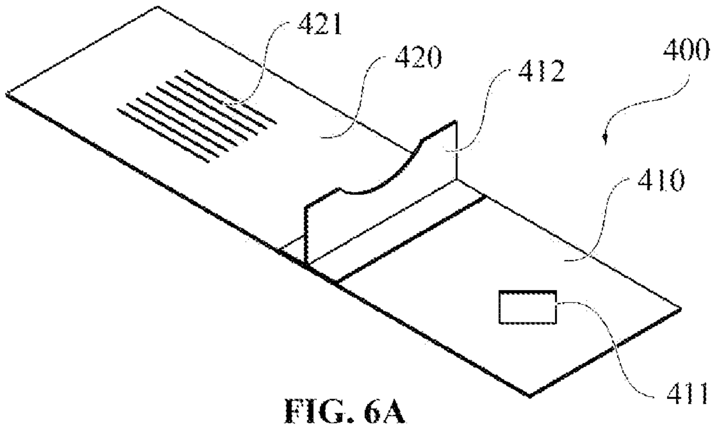
FIG. 6A, FIG. 6B and FIG. 6C show an embodiment of the head support of the present invention, where the base and the surface that is located on said base are shown.
Figure 6B:
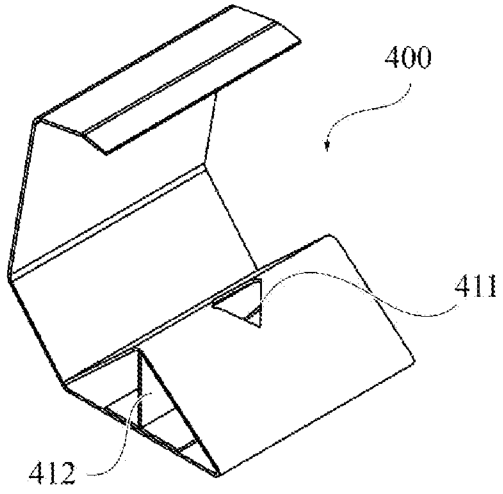
Figure 6C:
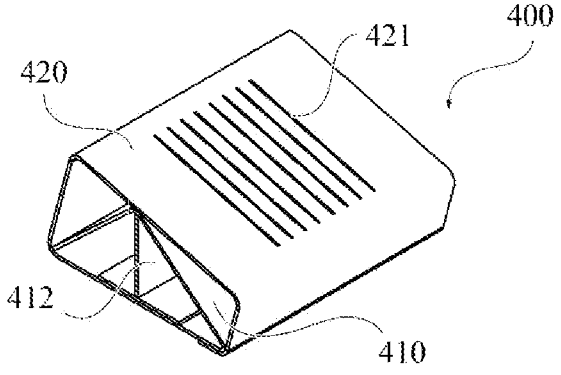

On the other hand, and referring to FIG. 6A, FIG. 6B and FIG. 6C, the coffin of the present invention can also include a head support (400) arranged on the lower side (20). Said head support (400) is made up of a base (410) of triangular cross section, and a surface (420) that lays on the base (410). Moreover, preferably the surface (420) has longitudinal cuts (421) that make said surface (420) more flexible and improve the ergonomics of the body placed inside the coffin. As the surface (420) is tilted, it allows for the upper part of the body to protrude from the bottom of the coffin and become more visible, giving the appearance that the head of the deceased is arranged on a pillow. Said head support (400) can be made with a material selected from the group consisting of paper, cardboard, cork, cellulosic composite materials, chipboard, or combinations thereof.

Furthermore, in some embodiments of the invention, such as the one illustrated in FIG. 6A, FIG. 6B and FIG. 6C, the structure of the head support (400) is foldable and includes a support plate (412) in the shape of an inverted T with a curvature to receive and support the weight of the head of the deceased. FIG. 6A shows the structure of the head support (400) unfolded, FIG. 6B shows how said structure is folded, arranging on the base (410) the surface (420) and FIG. 6C shows the head support (400) fully assembled.

Referring to FIG. 6A and FIG. 6B, the base (410) may include a notch (411) so that the surface (420) lays where the longitudinal cuts (421) allow for the head of the deceased to sink deeper and not tip easily during transport of the coffin (10).

On the other hand, and as previously mentioned, the coffin (10) of the present invention is preferably made from biodegradable, fast-growing and easily incinerated materials. For example, the cover surface (140) is preferably made of a plant material selected from the group consisting of reed, palm, banana, rush, osier, rattan, bamboo fibers, or combinations thereof. Also, the structure (100) is manufactured with a material selected from the group consisting of wood, chipboard (also known as MDF), cellulosic composite materials, or combinations thereof and other equivalents.

Moreover, the fastening elements that join the structure (100) and the frame of the inner lid (200) and outer lid (500) together are selected from the group consisting of adhesives such as wood cellulose, pneumatic nails, pressure joints, xxxx or combinations thereof.

Optionally, the coffin (10) interior, as well as the head support (400) are covered with a fabric such as linen or cotton without dyes or bleaching chemicals.

EXAMPLES

Example 1

Referring to FIG. 1 and FIG. 2, a biodegradable coffin (10) was designed and manufactured, comprising a structure (100) made of MDF, which included a first frame (110) and a second frame (120) with a hexagonal shape and twelve ribs (130) connected to the first frame and the second frame (120). Moreover, the structure included horizontal ribs (150) and transverse braces (160) in the first frame (110). The coffin (10) also included an inner lid (200) and an outer lid (500). In turn, the cover surface (140), and the surfaces of the inner lid (200) and outer lid (500) were made with continuous weaving of wicker and banana fiber.

The coffin (10) also featured six retractable handles (300) connected to the ribs (130). Said retractable handles (300) comprised a wooden handgrip (310), a lanyard (320) connected to the handgrip (310) and the first frame (110); and an elastic element (330) of natural rubber connected to the horizontal ribs (150) and coupled to the lanyard (320).

Moreover, the outer lid (500) of the coffin (10) had a fastening mechanism (510) that consisted of eight pins (511) connected to the second frame (120) and eight clips (512) connected to the outer lid (500) in its perimeter. Said outer lid (500) included a tab (520) inside the perimeter of its longitudinal sides that fit inside the second frame (120).

Finally, the coffin (10) included a head support (400) made of corrugated cardboard sheets with a base (410) of triangular cross section, and a surface (420) with longitudinal cuts (421). This base (410) included a notch (411) for the head of the deceased to rest on the surface (420) partially sinking due to the longitudinal cuts (421).

It shall be understood that the present invention is not limited to the embodiments described and depicted because, as will be evident to a person skilled in the art, there are possible variations and modifications that do not depart from the spirit of the invention, which is only defined by the following claims.

The invention claimed is:

1. A coffin with a lower side and an upper side, comprising:

- a structure that includes:
  - a first frame located on the lower side;
  - a second frame located on the upper side;
  - a plurality of ribs connected to the first frame and protruding towards the upper side connecting the second frame with said first frame;
  - a cover surface connected to the ribs;
  - an inner lid with an arcuate shape arranged on an inner side of the second frame, wherein ends of the inner lid lay on the ribs;
  - an outer lid arranged on the second frame; and
  - a fastening mechanism configured to join the outer lid to the second frame arranged on the cover surface.

2. The coffin of claim 1, further comprising a retractable handle arranged on the cover surface.

3. The coffin of claim 2, wherein the retractable handle comprises:

a handgrip;

a lanyard connected to the handgrip and the first frame; and an elastic element connected to the cover surface and coupled to the lanyard;

wherein the elastic element is configured to exert an elastic force on the lanyard allowing for the handgrip to be drawn towards the cover surface.

4. The coffin according to claim 3, further comprising a head support structure arranged on the lower side, comprising:

a base of triangular cross section;

a surface that lays on the base; and wherein the surface has longitudinal cuts which make the surface more flexible.

5. The coffin according to claim 2, further comprising a head support structure arranged on the lower side, comprising:

a base of triangular cross section;

a surface that lays on the base; and wherein the surface has longitudinal cuts which make the surface more flexible.

6. The coffin according to claim 1, further comprising a head support structure arranged on the lower side, comprising:

a base of triangular cross section;

a surface that lays on the base; and wherein the surface has longitudinal cuts which make the surface more flexible.

7. The coffin of claim 1, wherein the cover surface is made of a vegetable material that is selected from the group consisting of cane, palm, banana, reed, wicker, rattan, bamboo fibers, and combinations thereof.

8. The coffin of claim 1, wherein the structure is made of an agglomerated wood material.

* * * * *